United States Patent [19]
Hsu

[11] Patent Number: 6,047,753
[45] Date of Patent: Apr. 11, 2000

[54] VEHICLE INNER TUBE WITH PROTECTIVE BREAKER MEANS

[76] Inventor: Shut Chen Hsu, No. 7, Alley 1, Lane 163, Sec. 3, Nung-Chuan Rd., 1 Lan, Taiwan

[21] Appl. No.: 09/193,232

[22] Filed: Nov. 17, 1998

[51] Int. Cl.⁷ ...................................................... B60C 5/08
[52] U.S. Cl. ...................... 152/157; 152/159; 152/195; 152/203; 152/317; 152/336.1; 152/512
[58] Field of Search ................................... 152/157–159, 152/166, 165, 195, 203–207, 317, 333.1, 336.1, 511, 512

[56] References Cited

U.S. PATENT DOCUMENTS

| 1,323,259 | 12/1919 | Falvey | 152/206 |
| 1,415,140 | 5/1922 | Beckman | 152/317 |
| 3,256,123 | 6/1966 | Hart | 152/317 |

*Primary Examiner*—Geoffrey L. Knable
*Attorney, Agent, or Firm*—Rosenberg, Klein & Lee

[57] ABSTRACT

A vehicle inner tube includes an inflatable tube, a protective tube mounted around the inflatable tube for protection, the protective tube formed of a plurality of air balls and having recessed breaker seats equiangularly spaced around its inner diameter, a plurality of breaker units respectively mounted on the inner diameter of the protective tube and partially overlapped on one another and adhered to recessed breaker seats in the protective tube, the breaker units each including a flexible breaker holder having two reversely horizontally extended side insertion slots and a downwardly obliquely extended bottom insertion slot, two side breakers respectively directly inserted into the horizontal insertion slots and partially projecting out of the breaker holder at two opposite sides, and a bottom breaker inserted into the bottom insertion slot and secured thereto by glue means, an endless cover layer covered on the protective tube and adhered thereto by glue means, the endless cover layer comprising a plurality of pockets bilaterally disposed on the inside and a plurality of S-shaped breakers respectively mounted in the pockets.

1 Claim, 7 Drawing Sheets

VEHICLE INNER TUBE WITH PROTECTIVE BREAKER MEANS

BACKGROUND OF THE INVENTION

The present invention relates to a vehicle inner tube for a motor vehicle, and more particularly to such a vehicle inner tube which has protective breaker means for protection against piercing of an external pointed object.

Regular motorcycle and automobile tires do not have an inner tube. When an external pointed object pierces the tire of a motor vehicle, air does not immediately leak out. However, if the motor vehicle keeps running for a certain length of time after piercing of an external pointed object through one tire thereof, the tire may explode, causing a catastrophe.

SUMMARY OF THE INVENTION

It is the main object of the present invention to provide a vehicle inner tube for a vehicle tire which has breaker means for protection against piercing of an external pointed object. According to the present invention, the vehicle inner tube comprises an inflatable tube; a protective tube mounted around the inflatable tube for protection, the protective tube being formed of a plurality of spherical elements, the spherical elements each defining an air chamber, the protective tube having an inner diameter and a plurality of recessed breaker seats equiangularly spaced around the inner diameter; a plurality of breaker units respectively mounted on the inner diameter of the protective tube and partially overlapped on one another, and adhered to the recessed breaker seats, the breaker units each comprising a flexible breaker holder having two reversely horizontally extended side insertion slots and a downwardly obliquely extended bottom insertion slot, two side breakers respectively directly inserted into the horizontal insertion slots and partially projecting out of the breaker holder at two opposite sides, and a bottom breaker inserted into the bottom insertion slot and secured thereto by glue means; and an endless cover layer covered on the protective tube and adhered thereto by glue means, the endless cover layer comprising a plurality of pockets bilaterally disposed on the inside and adhered to the periphery of the protective tube, and a plurality of S-shaped breakers respectively mounted in the pockets.

DETAILED DESCRIPTION OF THE PREFERRED EMBODIMENT

Figure 1:
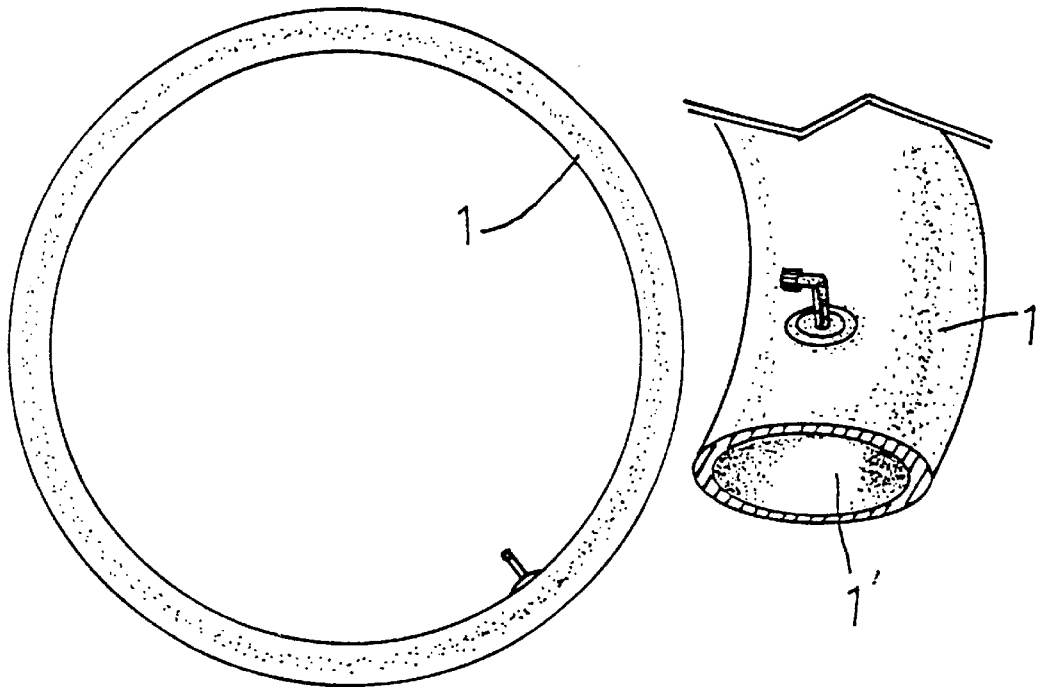
FIG. 1 illustrates an inflatable tube for a vehicle inner tube according to the present invention.

Referring to FIG. 1, an inflatable tube, referenced by 1, is shown defining an air chamber 1'.

Figure 2:
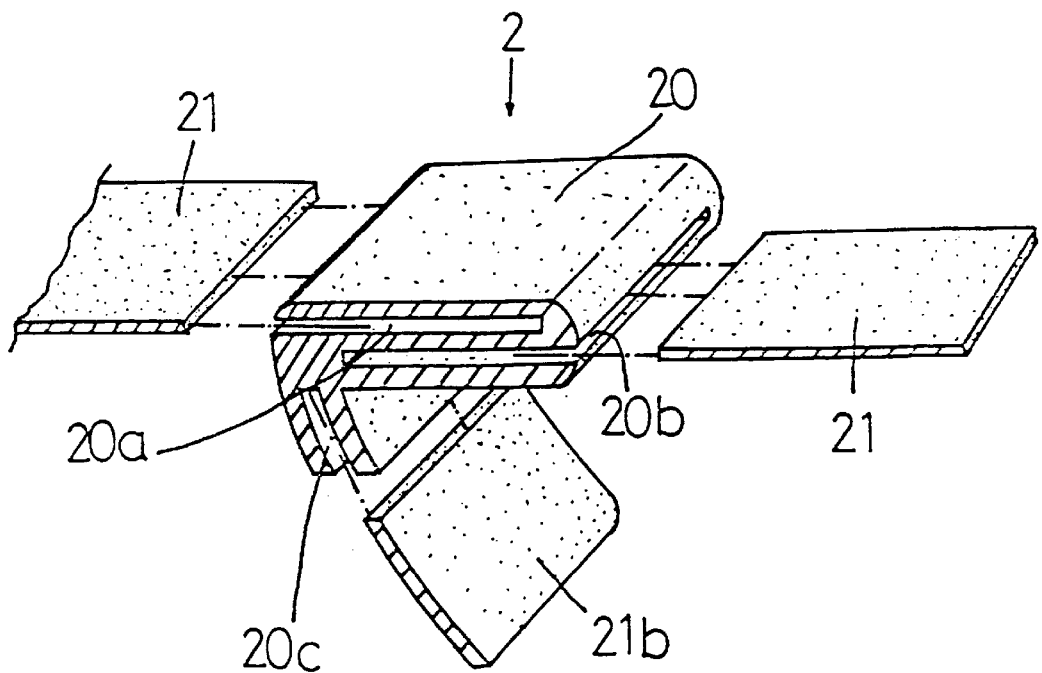
FIG. 2 is an exploded view of a breaker unit for a vehicle inner tube according to the present invention.

Referring to FIG. 2, a breaker unit 2 is shown comprised of a flexible breaker holder 20 having two reversely horizontally extended side insertion slots 20a, 20b and a downwardly obliquely extended bottom insertion slot 20c, two side breakers 21 respectively directly inserted into the horizontal insertion slots 20a, 20b and partially projecting out of the breaker holder 20 at two opposite sides, and a bottom breaker 21b inserted into the bottom insertion slot 20c and secured thereto by glue.

Figure 3:
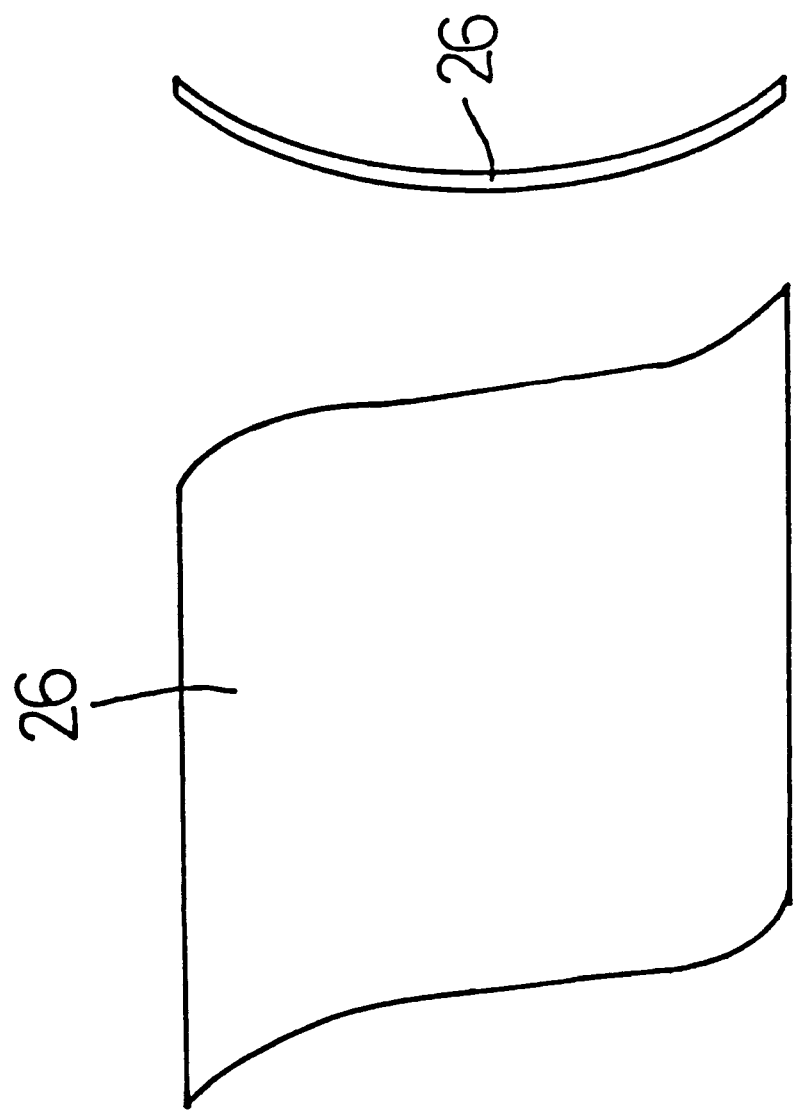
FIG. 3 illustrates a S-shaped breaker for a vehicle inner tube according to the present invention.

FIG. 3 shows a breaker 26 having a substantially S-shaped profile and a smoothly curved surface.

Figure 4:
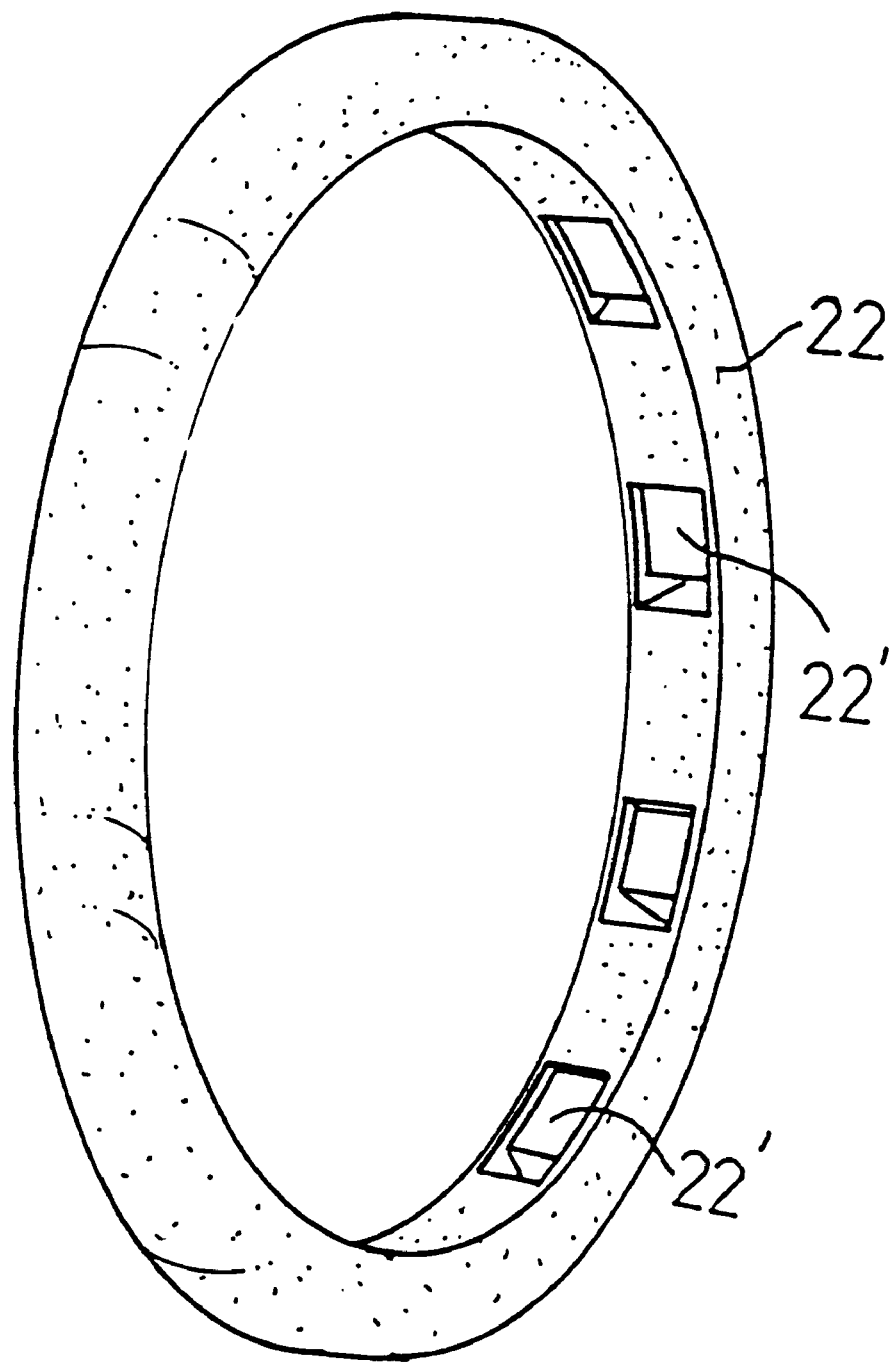
FIG. 4 is a perspective view of a protective tube for a vehicle inner tube according to the present invention.
Figure 5:
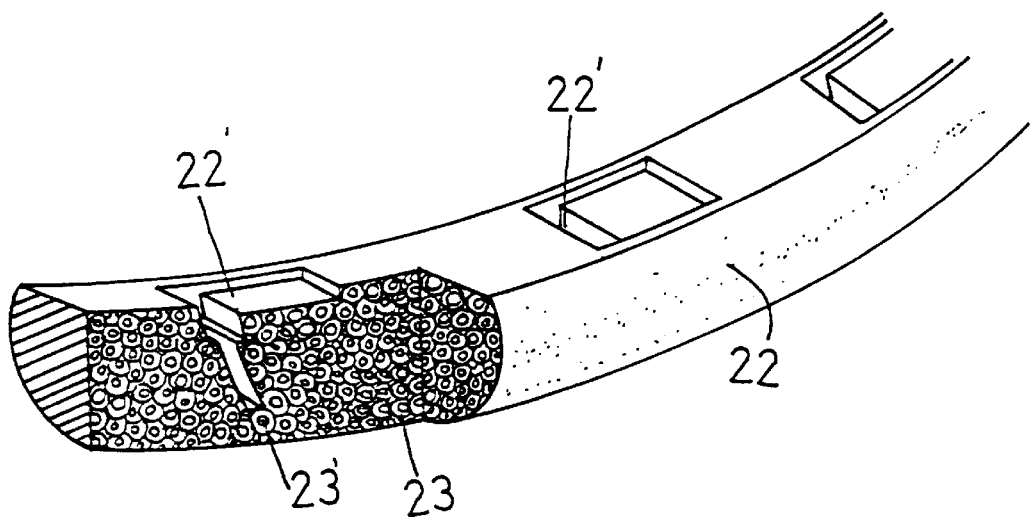
FIG. 5 is a sectional elevation in an enlarged scale of a part of the protective tube shown in FIG. 4.
Figure 6:
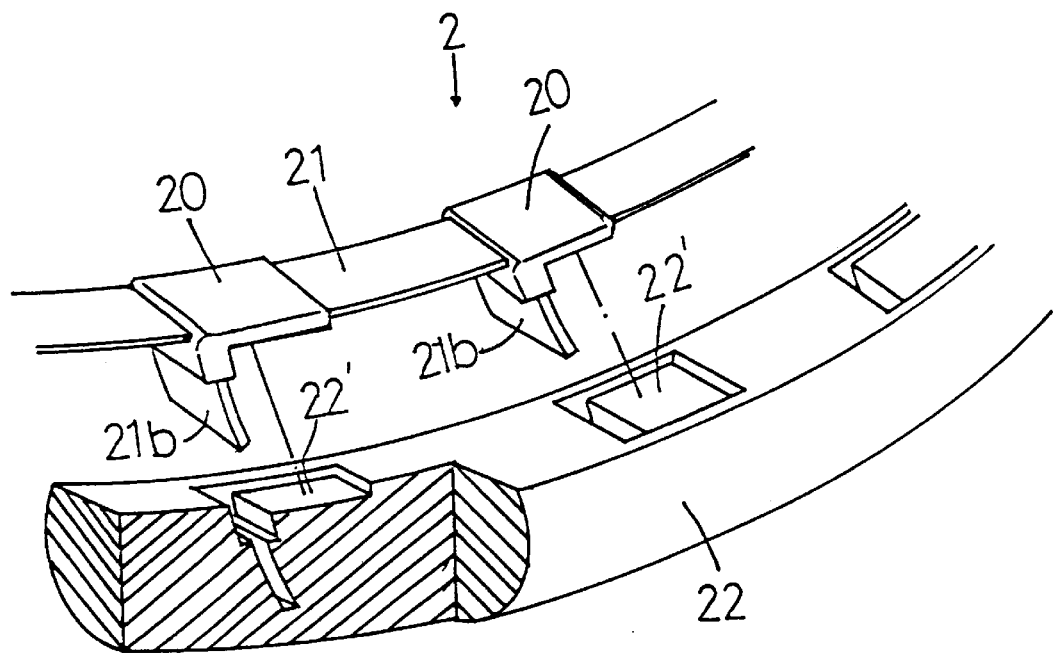
FIG. 6 illustrates the installation of breaker units in the protective tube according to the present invention.
Figure 7A:
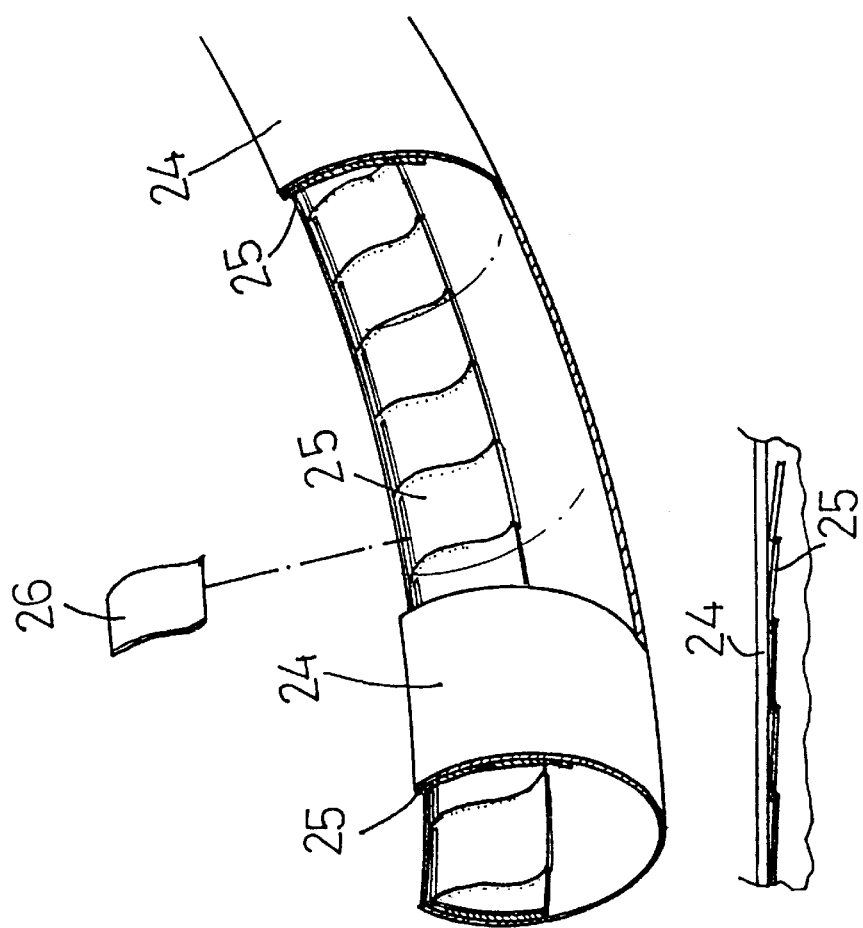
FIG. 7A illustrates the arrangement of the pockets in the endless cover layer according to the present invention.
Figure 7:
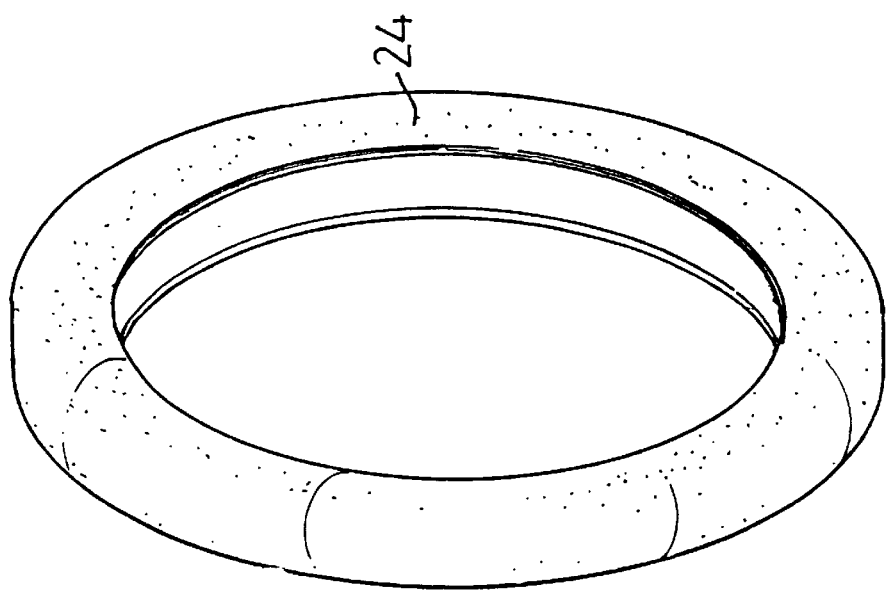
FIG. 7 is a perspective view of an endless cover layer for a vehicle inner tube according to the present invention.
Figure 8:
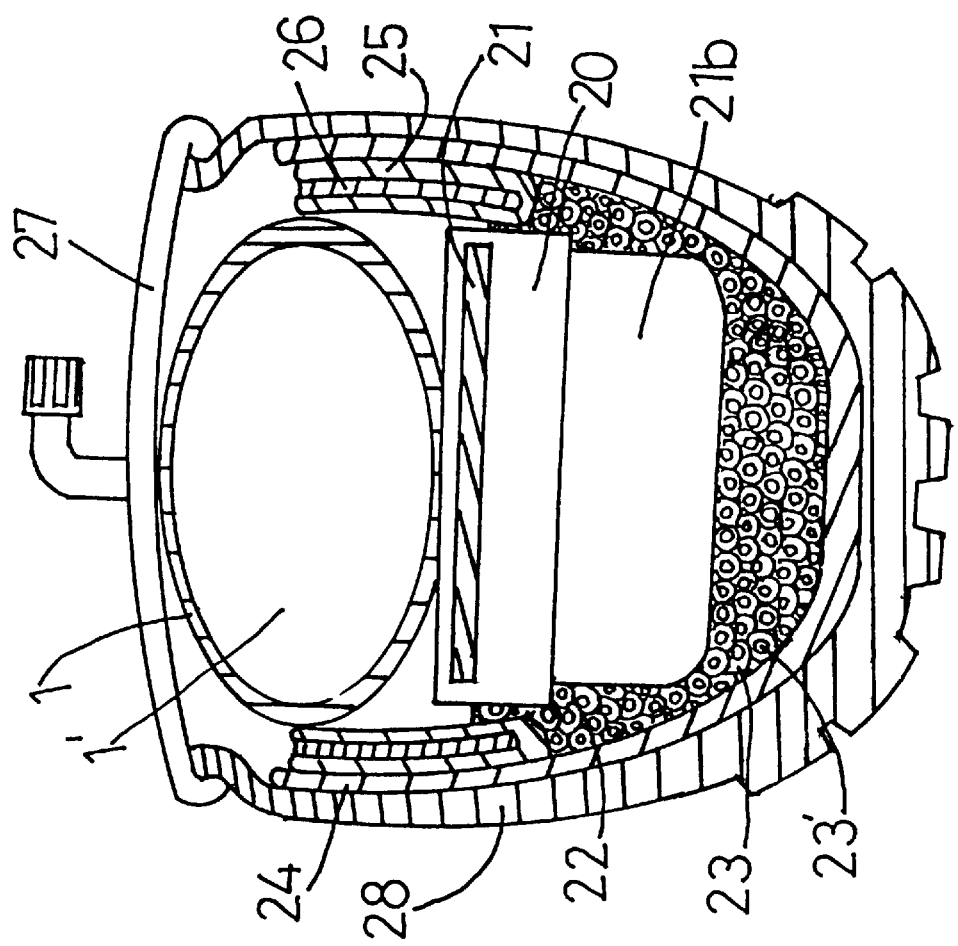
FIG. 8 is a sectional view showing the vehicle inner tube installed in an outer tire according to the present invention.
Figure 7B:
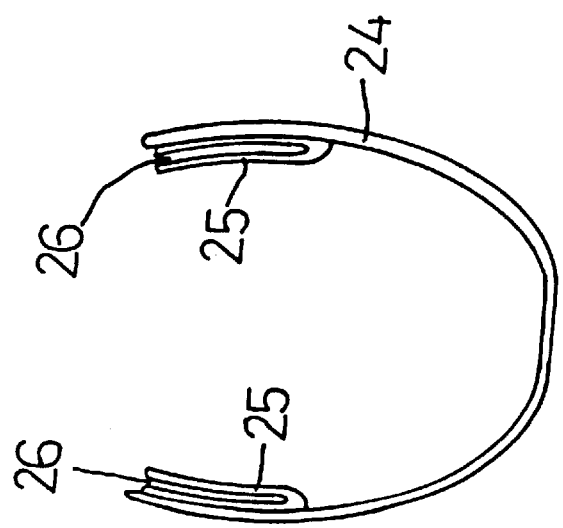
FIG. 7B is a schematic drawing showing S-shaped breakers installed in the pockets inside the endless cover layer according to the present invention.

Referring to FIGS. from 4 through 8 and FIGS. from 1 through 3 again, a protective tube 22 is shown formed of spherical elements 23, each spherical element 23 defining an air chamber 23' (see FIG. 5). The protective tube 22 has a plurality of recessed breaker seats 22' equiangularly spaced around its inner diameter (see FIG. 4). A plurality of breaker units 2 are mounted on the inner diameter of the protective tube 22, and adhered to the recessed breaker seats 22' by glue, permitting the side breakers 21 of the breaker units 2 to be respectively overlapped on one another (see FIGS. 5 and 6). An endless cover layer 24 of substantially U-shaped cross section is covered on the protective tube 22, and adhered thereto by glue (see FIG. 8). The endless cover layer 24 comprises a plurality of pockets 25 bilaterally disposed on the inside (see FIGS. 7 and 7A). A plurality of S-shaped breakers 26 are respectively mounted in the pockets 25 inside the endless cover layer 24 (see FIGS. 7. 7A and 7B). The aforesaid inflatable tube 1 is then mounted with the assembly of the endless cover layer 24 and the protective tube 22 in an outer tire 28, and then a frame 27 is fastened to the outer tire 28 and the inflatable tube 1. When installed compressed air is pumped into the air chamber 1' of the inflatable tube 1. When the inflatable tube 1 is inflated, the protective tube 22, the breaker units 2 and the S-shaped breakers 26 are forced outwards against the inner wall of the outer tire 28 to protect the inflatable tube 1. When a pointed object is pierced through the outer tire 28, it is prohibited by the protective tube 22, the breaker units 2 and the S-shaped breakers 26 from damaging the inflatable tube 1.

Figure 9:
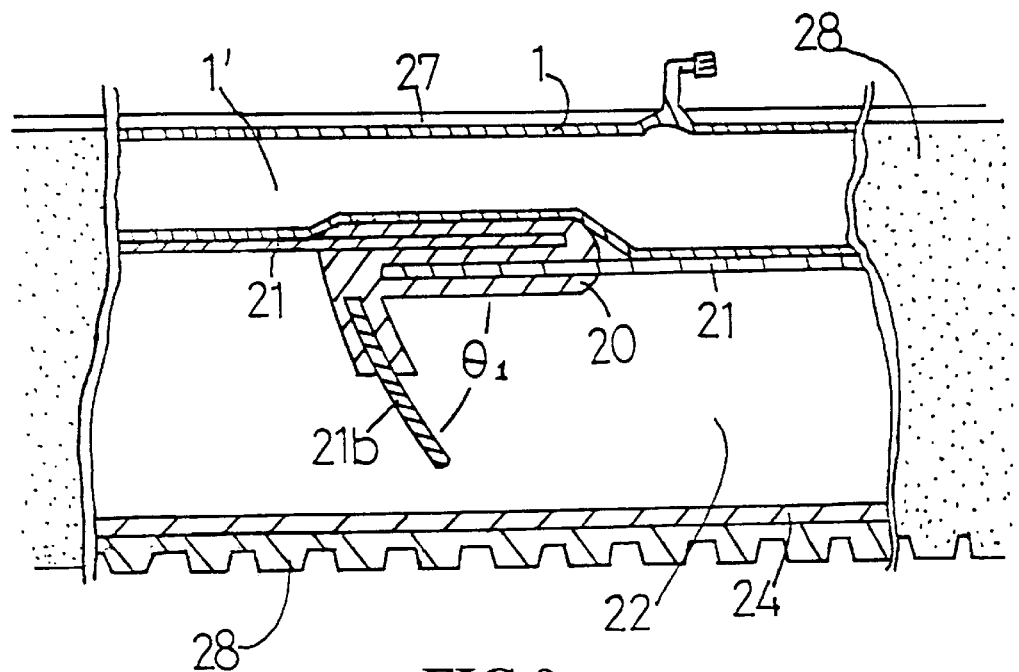
FIG. 9 is a schematic drawing showing a status of the vehicle inner tube of the present invention before inflation of the inflatable tube.
Figure 10:
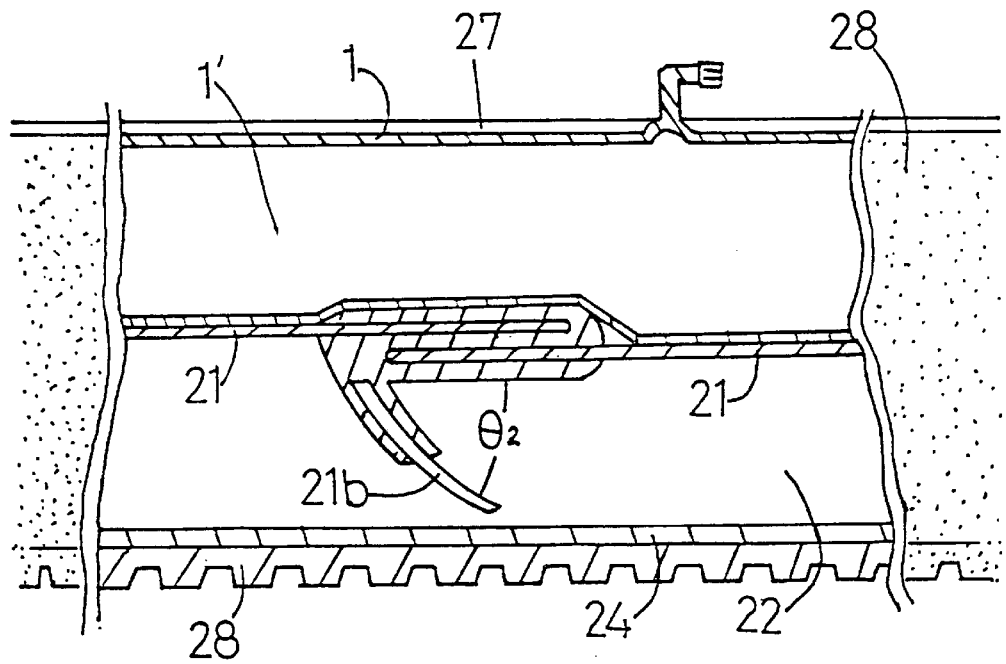
FIG. 10 is a schematic drawing showing a status of the vehicle inner tube of the present invention after inflation of the inflatable tube.

FIG. 9 shows a status of the inner tube where the inflatable tube 1 is not inflated. FIG. 10 shows another status of the inner tube where the inflatable tube 1 is inflated. As illustrated in FIG. 10, when the inflatable tube 1 is inflated, the protective tube 22 is flattened, and the contained angle between the bottom breaker 21b and the breaker holder 20 is relatively reduced and changed from θ1 to θ2.

What the invention claimed is:

1. A vehicle inner tube comprising:
   an inflatable tube;
   a protective tube mounted around said inflatable tube for protection, said protective tube formed of a plurality of spherical elements, said spherical elements each defining an air chamber, said protective tube having an inner diameter and a plurality of recessed breaker seats equiangularly spaced around the inner diameter;

a plurality of breaker units respectively mounted on the inner diameter of said protective tube and partially overlapped on one another, and adhered to said recessed breaker seats, said breaker units each comprising a flexible breaker holder having two reversely horizontally extended side insertion slots and a downwardly obliquely extended bottom insertion slot, two side breakers respectively directly inserted into said horizontal insertion slots and partially projecting out of the breaker holder at two opposite sides, and a bottom breaker inserted into said bottom insertion slot and secured thereto by glue means; and an endless cover layer covered on said protective tube and adhered thereto by glue means, said endless cover layer comprising a plurality of pockets bilaterally disposed on the inside and adhered to the periphery of said protective tube, and a plurality of S-shaped breakers respectively mounted in said pockets.

\* \* \* \* \*